United States Patent
Gardner et al.

(10) Patent No.: US 10,006,374 B2
(45) Date of Patent: Jun. 26, 2018

(54) CONTROL OF A GAS TURBINE ENGINE

(71) Applicant: ROLLS-ROYCE PLC, London (GB)

(72) Inventors: Alasdair Gardner, Derby (GB);
Arthur Laurence Rowe, Derby (GB);
Mark David Taylor, Derby (GB);
Nicholas Howarth, Derby (GB)

(73) Assignee: ROLLS-ROYCE plc, London (GB)

( * ) Notice: Subject to any disclaimer, the term of this patent is extended or adjusted under 35 U.S.C. 154(b) by 520 days.

(21) Appl. No.: 14/688,423

(22) Filed: Apr. 16, 2015

(65) Prior Publication Data
US 2015/0308353 A1    Oct. 29, 2015

(30) Foreign Application Priority Data

Apr. 25, 2014   (GB) .................................. 1407314.2

(51) Int. Cl.
| | |
|---|---|
| F02C 9/22 | (2006.01) |
| F01D 17/16 | (2006.01) |
| F02C 9/20 | (2006.01) |
| F02C 9/54 | (2006.01) |
| F02C 6/00 | (2006.01) |
| F02C 7/36 | (2006.01) |

(52) U.S. Cl.
CPC ............. *F02C 9/22* (2013.01); *F01D 17/162* (2013.01); *F02C 6/00* (2013.01); *F02C 7/36* (2013.01);
(Continued)

(58) Field of Classification Search
CPC ...... F02C 9/20; F02C 9/22; F02C 9/28; F02C 9/54; F02C 6/00; F02C 7/36;
(Continued)

(56) References Cited

U.S. PATENT DOCUMENTS

| | | | |
|---|---|---|---|
| 5,281,087 A | * | 1/1994 | Hines .................... F01D 17/162 415/160 |
| 5,832,714 A | | 11/1998 | Hines |

(Continued)

FOREIGN PATENT DOCUMENTS

| | | |
|---|---|---|
| EP | 1 252 424 B1 | 4/2008 |
| EP | 2 148 044 A2 | 1/2010 |

(Continued)

OTHER PUBLICATIONS

Sep. 14, 2015 Search Report issued in European Patent Application No. 15 16 3815.
(Continued)

*Primary Examiner* — Phutthiwat Wongwian
*Assistant Examiner* — Loren Edwards
(74) *Attorney, Agent, or Firm* — Oliff PLC (57) ABSTRACT

An engine that has, in axial flow series, booster compressor, core compressor, combustion equipment, core turbine, and low-pressure turbine. Core turbine drives core compressor via an interconnecting high-pressure shaft. Low-pressure turbine drives booster compressor via an interconnecting low-pressure shaft. Low-pressure turbine also drives external load having a defined speed characteristic that dictates speed of the low-pressure turbine and booster compressor. Booster compressor has one or more rows of variable stator vanes. The method includes: scheduling variation in the angle of variable stator vanes as a function of speed of the booster compressor wherein the vanes open as booster compressor speed increases; measuring or setting one or more operational parameters which are determinative of temperature at entry to core turbine; and biasing scheduling of angle variation of variable stator vanes as a function of operational parameter(s) to reduce variation in temperature at entry to core turbine.

14 Claims, 7 Drawing Sheets

(52) U.S. Cl.
CPC ............ *F02C 9/20* (2013.01); *F02C 9/54* (2013.01); *F05D 2220/32* (2013.01); *F05D 2220/76* (2013.01); *F05D 2270/05* (2013.01); *F05D 2270/06* (2013.01); *F05D 2270/303* (2013.01); *F05D 2270/304* (2013.01); *Y02T 50/671* (2013.01)

(58) Field of Classification Search
CPC .............. F01D 17/162; F05D 2270/05; F05D 2270/06; Y02T 50/671
See application file for complete search history.

(56) References Cited

U.S. PATENT DOCUMENTS

| | | | |
|---|---|---|---|
| 2003/0011199 A1* | 1/2003 | Wickert | F01D 15/10 290/52 |
| 2006/0130456 A1* | 6/2006 | Suciu | F01D 5/066 60/226.1 |
| 2011/0142602 A1* | 6/2011 | Adhami | F01D 17/162 415/159 |
| 2012/0259528 A1 | 10/2012 | Minto | |
| 2013/0039736 A1 | 2/2013 | Waugh et al. | |
| 2013/0236296 A1* | 9/2013 | Collopy | F02C 9/20 415/162 |

FOREIGN PATENT DOCUMENTS

| | | |
|---|---|---|
| EP | 2 535 525 A2 | 12/2012 |
| EP | 2 634 396 A2 | 9/2013 |

OTHER PUBLICATIONS

Nov. 14, 2014 United Kingdom Search Report issued in Application No. GB1407314.2.

* cited by examiner

CONTROL OF A GAS TURBINE ENGINE

FIELD OF THE INVENTION

The present invention relates to control of a gas turbine engine.

BACKGROUND OF THE INVENTION

The power output from a gas turbine engine is directly proportional to both the temperature at which it operates and the quantity of air that flows through it. For a conventional gas turbine engine in which each compressor is powered by an independent turbine, the relationship between core flow and temperatures is fixed. In order to increase the power output from the engine more fuel must be burned in the combustor. This increases both core flow and temperatures. The operating temperatures of the engine must be closely monitored and the fuel supply regulated to prevent the temperature capability of the engine being exceeded. For an engine of fixed physical size and pressure ratio (and hence core flow) the temperature capability of the engine therefore places a practical limit on the power output available from it.

Figure 1:
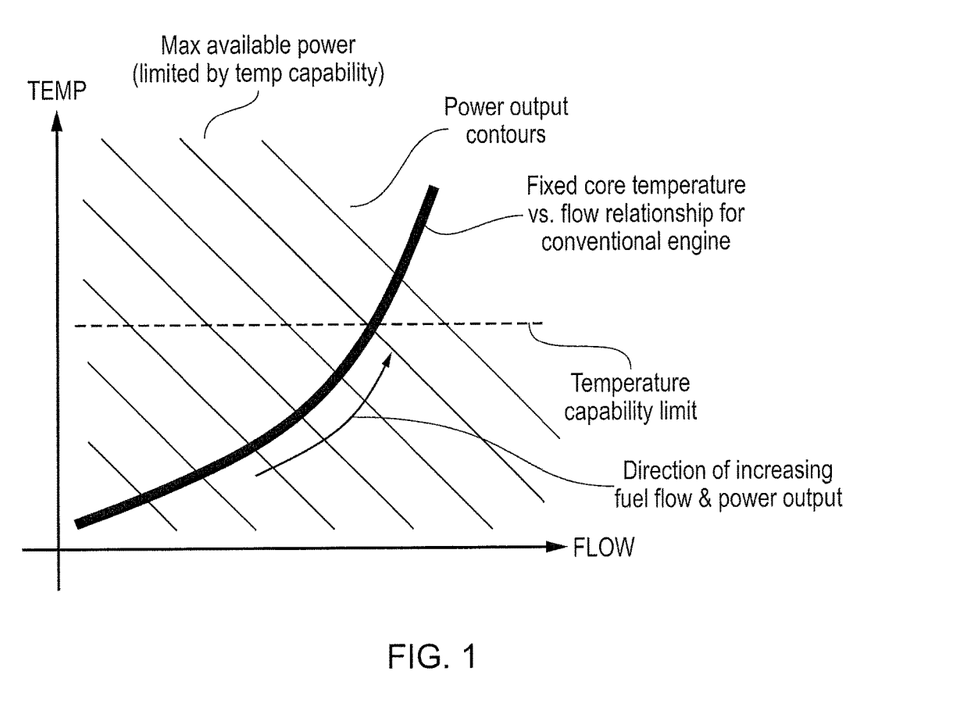
FIG. 1 shows a schematic graph of engine operating temperature against core flow, and plots as a thick solid line the relationship between temperature and core flow of a conventional engine.

This is illustrated in FIG. 1 which shows a schematic graph of engine operating temperature against core flow, and plots as a thick solid line the relationship between temperature and core flow of a given conventional engine. As indicated by the arrowed line, changing the fuel flow changes the position of the engine on the line. Also plotted on the graph are contours of equal power output. Combining these with the temperature capability limit of the engine shows that there is a maximum power output that can be obtained from the engine, determined by that limit.

If the maximum available power is less than that required, then either the temperature capability of the engine must be increased (e.g. by using higher grade materials or increasing cooling flows within the engine hot section), or the engine must be redesigned to increase the amount of core flow that passes through the engine. This can be achieved by increasing the physical size of the engine or increasing the core pressure ratio.

The fixed core flow vs. temperature relationship of a conventional gas turbine has two major implications for its design and operation. Firstly, the engine must be physically sized and the temperature capability of the components designed for the most arduous operating conditions (i.e. maximum power output requirement). For a civil aero engine this is typically take-off operation on a warm day. Much of the time the engine will operate at less arduous conditions (e.g. cruise) where the reduced power demand could be supplied more efficiently by a smaller engine or one of reduced temperature capability.

Secondly, as the engine deteriorates over time, its operating temperatures increase due to the reduction in component efficiencies. The maximum power output capability of the engine therefore reduces until it is no longer able to supply the required power. A new engine must therefore be over-designed to accommodate the effects of deterioration.

The compressors of conventional gas turbine engines typically have variable stator vanes (VSVs) which are used to increase the compressor stability margin at off design conditions by controlling the incidence onto the blading and the distribution of work between the stages of the compressor. As the VSVs are rotated the spool speed changes, such that the work done by the compressor remains approximately constant. The core flow vs. temperature relationship of the engine therefore remains unchanged when the VSVs are adjusted. Typically the VSVs are scheduled to progressively open as the engine speed increases. By "variable stator vanes" we mean both vanes that are located between rows of rotating compressor blades and vanes (often called "inlet guide vanes") which are located at the inlet to the compressor.

SUMMARY OF THE INVENTION

It would be desirable to be able to vary the core flow vs. temperature relationship of an engine as needed to meet the varying demands on the engine.

Accordingly, in a first aspect, the present invention provides a method of controlling a gas turbine engine having in axial flow series a booster compressor, a core compressor, combustion equipment, a core turbine, and a low-pressure turbine, the core turbine driving the core compressor via an interconnecting high-pressure shaft, the low-pressure turbine driving the booster compressor via an interconnecting low-pressure shaft, and the low-pressure turbine also driving an external load having a defined speed characteristic that dictates the speed of the low-pressure turbine and booster compressor, the booster compressor having one or more rows of variable stator vanes, wherein the method includes:

scheduling variation in the angle of the variable stator vanes as a function of the speed of the booster compressor such that the vanes open as the booster compressor speed increases;

measuring or setting one or more operational parameters which are determinative of the temperature at entry to the core turbine; and biasing the scheduling of the angle variation of the variable stator vanes as a function of the operational parameter(s) to reduce variation in temperature at entry to the core turbine.

The present invention is at least partly based on a realisation that an engine architecture with VSVs on a booster compressor which is constrained to run in a fixed speed relationship to an external load has the property that the relationship between core flow and temperature can be controlled by manipulation of the VSVs. This is because changing the VSV angle controls the amount of work done by the booster compressor, whilst its speed, which is set by the characteristics of the external load, remains fixed. For example, if the VSVs are opened the angle of incidence on the rotors increases and therefore more work is done by the booster compressor. Its pressure ratio will therefore increase and in doing so it will drive more flow into the core. If the turbine temperature is maintained constant at the same time as opening the VSVs by regulating fuel flow, the power output from the engine will increase.

Put another way, in a conventional engine in which each compressor is powered by an independent turbine, it is the speed characteristic of the compressor on each spool which dictates the rotational speed of that spool at each operating point. By speed characteristic is meant the variation of compressor aero work with speed. This is because the work output of a turbine is substantially invariant with speed. For a given spool power, there are many different turbine speeds but only one compressor speed at which conservation of energy may be satisfied. The compressor workspeed relationship therefore sets the speed of the spool. For example, in the case of a conventional turbofan aero engine it is the speed characteristic of the fan (the external load) which dictates the speed of the low pressure spool at each operating point, and in the case of a gas turbine with a free power turbine powering an external load (e.g. electricity generation) it is the speed characteristic of the load which dictates the speed of the free power turbine. However, according to the present invention, the speed characteristic of the external load dictates the speed of the low-pressure spool, and hence the speed of the low pressure turbine and the booster compressor. Articulation of the VSVs therefore allows the amount of work done by the booster compressor to be controlled whilst its speed, which is set by the external load, remains fixed.

The ability to independently control core flow and temperature in this boosted engine architecture through manipulation of the booster VSVs provides a means to overcome the problems identified above with conventional gas turbines. For example, it can be used to:

Increase the available power output from an engine of fixed physical size and temperature capability, relative to that of a conventional engine.

Satisfy the maximum power output requirement using a smaller engine or one of reduced temperature capability, relative to a conventional engine. The engine can be more efficient during normal operation when the power output is reduced (e.g. at cruise in an aeroengine).

Accommodate the effects of engine deterioration whilst maintaining constant power output capability, by progressively biasing the scheduling by opening the VSVs to keep operating temperatures constant.

Reduce the rate of consumption of component life at all operating conditions.

In a second aspect, the present invention provides a control system for controlling a gas turbine engine having in axial flow series a booster compressor, a core compressor, combustion equipment, a core turbine, and a low-pressure turbine, the core turbine driving the core compressor via an interconnecting high-pressure shaft, the low-pressure turbine driving the booster compressor via an interconnecting low pressure shaft, and the low-pressure turbine also driving an external load having a defined speed characteristic that dictates the speed of the low-pressure turbine and booster compressor, the booster compressor having one or more rows of variable stator vanes, wherein the control system is configured to perform the method of the first aspect.

Thus, the control system can be configured to:

schedule variation in the angle of the variable stator vanes as a function of the speed of the booster compressor such that the vanes open as the booster compressor speed increases;

measure or set one or more operational parameters which are determinative of the temperature at entry to the core turbine; and bias the scheduling of the angle variation of the variable stator vanes as a function of the operational parameter (s) to reduce variation in temperature at entry to the core turbine.

The control system can be computer-based, having one or more processors to perform the method of the first aspect. For example, the control system can be embodied in an electronic engine controller (EEC), which may be a full authority digital engine control (FADEC) system.

In a third aspect, the present invention provides a gas turbine engine having in axial flow series a booster compressor, a core compressor, combustion equipment, a core turbine, and a low-pressure turbine, the core turbine driving the core compressor via an interconnecting high-pressure shaft, the low-pressure turbine driving the booster compressor via an interconnecting low pressure shaft, and the low-pressure turbine also driving an external load having a defined speed characteristic that dictates the speed of the low-pressure turbine and booster compressor, wherein the engine further has the control system of the second aspect.

Further aspects of the present invention provide: a computer program comprising code which, when run on a computer, causes the computer to perform the method of the first aspect; and a computer readable medium storing a computer program comprising code which, when run on a computer, causes the computer to perform the method of the first aspect.

Optional features of the invention will now be set out. These are applicable singly or in any combination with any aspect of the invention.

The scheduling of the angle variation of the VSVs can be biased so that the temperature at entry to the core turbine remains substantially constant across a range of engine power demand levels and/or across a range of air temperatures at the inlet of the air intake to the engine. For example, the range of engine power demand levels may vary by a factor of 10 or more, or preferably by a factor of 100 or more. The range of air temperatures at the inlet of the air intake, e.g. of a modern civil aeroengine, may vary in the range 180 K to 350 K.

The variation in the angle of the VSVs may be scheduled as a function of $N/\sqrt{T}$, where N is the booster compressor speed and T is the temperature of the inlet air to the fan or the temperature of the inlet air to the booster compressor.

Generally, it is difficult to obtain a direct measure of the temperature at entry to the core turbine. However, the temperature can be measured indirectly or inferred from other operational parameters.

Thus, according to one option, the operational parameters are a power demand parameter setting the power output of the engine, and an air temperature measured at a position upstream of the combustion equipment (e.g. measured at the inlet of the air intake to the engine, or at entry to the booster compressor). In principle, these parameters allow the temperature at entry to the core turbine to be inferred.

According to another option, the operational parameters include a different indirect measure of the temperature at entry to the core turbine. For example, the operational parameters can include a measure of the temperature at entry to the low-pressure turbine. The operational parameters may further include a measure of the temperature of the air exiting the core compressor. By using both parameters, the scheduling bias can be defined in such a way as to minimise or reduce the consumption of turbine life at all operating conditions. Indeed, the method may further include calculating an error between the (indirectly) measured temperature at entry to the core turbine and a desired temperature at entry to the core turbine at the measured temperature of the air exiting the core compressor, the scheduling of the angle variation of the VSVs being biased as a function of the calculated error. For example, the calculated error can be an input into a closed loop (e.g. PID) controller which determines the scheduling bias in order to reduce the error while maintaining a constant engine power output.

The engine may further have a cooled cooling air system which cools a flow of cooling air extracted from the core compressor and used to cool the combustion equipment and/or the core turbine. However, by using the VSVs to reduce the core turbine entry temperature at a given power setting, the temperature of the cooling flow extracted from the core compressor is increased. Thus, in this case, the method may further include varying the amount of cooling performed by the cooled cooling air system to compensate for variation in the temperature of the flow extracted from the core compressor.

The gas turbine engine may be a turbofan, the external load then being a propulsive fan. Such a fan typically has a defined speed characteristic in which its speed varies in a predetermined fashion relative to the power produced by the low-pressure turbine. In particular, the turbofan may be a geared turbofan, the propulsive fan being operatively connected to the low-pressure shaft via a gearbox. Controlling the relationship between core flow and temperature by manipulation of the VSVs of a geared turbofan can be especially effective because in such an engine the booster compressor typically provides a relatively high pressure ratio, and thus varying the angle of the VSVs can have a correspondingly important effect on the core flow versus temperature relationship.

Another option is for the gas turbine engine to be a static power generating engine, the external load being an electricity generator. Such a load typically runs at a constant speed, imposed by a need to generate electricity at a fixed frequency.

The gas turbine engine may be for use in other applications where the engine has an external load, such as marine power generation or helicopter power generation.

BRIEF DESCRIPTION OF THE DRAWINGS

Embodiments of the invention will now be described by way of example with reference to the accompanying drawings in which.

DETAILED DESCRIPTION AND FURTHER OPTIONAL FEATURES OF THE INVENTION

Figure 2:
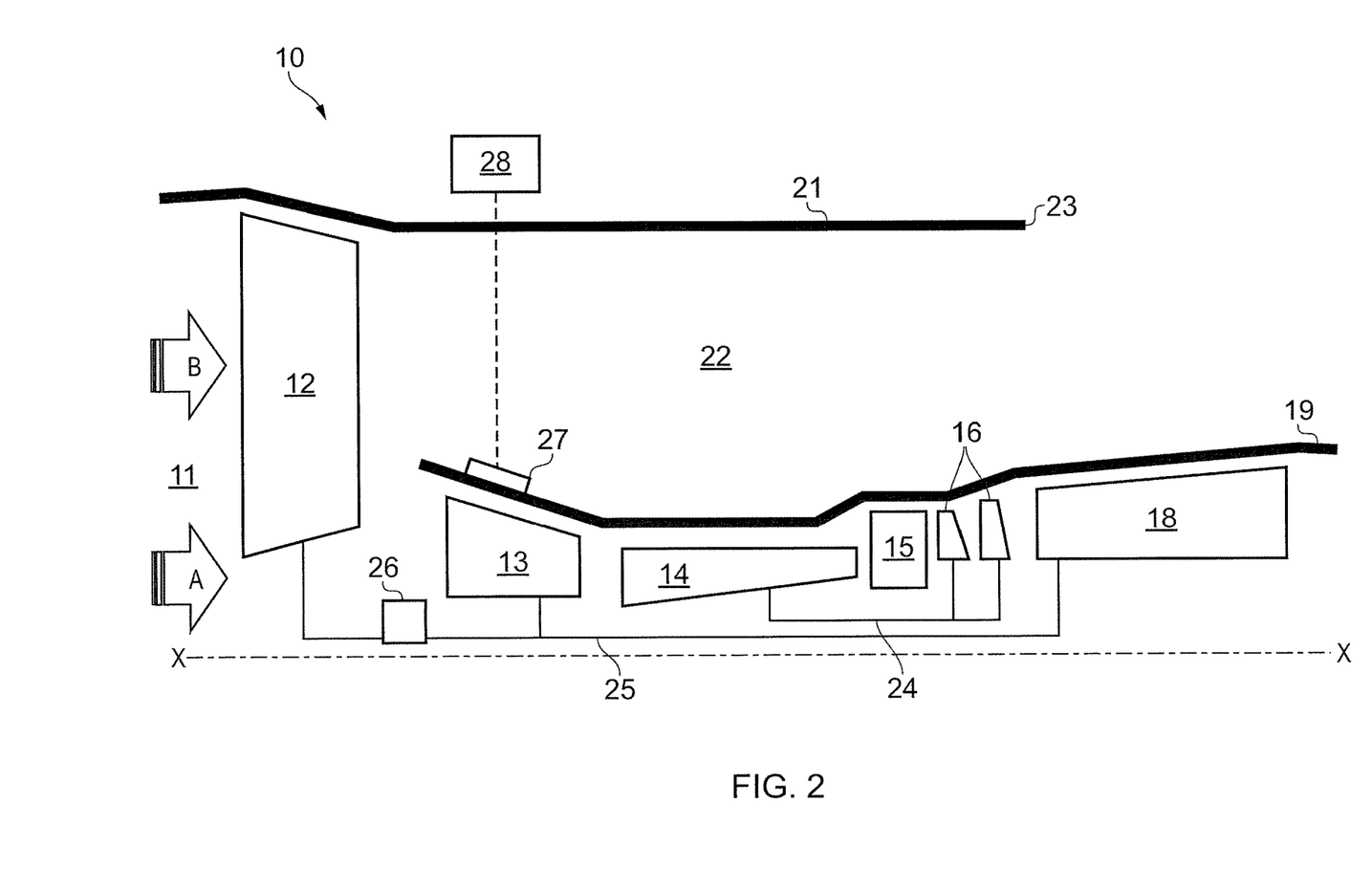
FIG. 2 shows schematically elements of a geared, ducted fan gas turbine engine.

With reference to FIG. 2, a geared, ducted fan gas turbine engine incorporating the invention is generally indicated at 10 and has a principal and rotational axis X-X. The engine comprises, in axial flow series, an air intake 11, a propulsive fan 12, a booster compressor 13, a core compressor 14, combustion equipment 15, a core turbine 16, a low-pressure turbine 18 and a core engine exhaust nozzle 19. A nacelle 21 generally surrounds the engine 10 and defines the intake 11, a bypass duct 22 and a bypass exhaust nozzle 23.

During operation, air entering the intake 11 is accelerated by the fan 12 to produce two air flows: a first air flow A into the booster compressor 13 and a second air flow B which passes through the bypass duct 22 to provide propulsive thrust. The booster compressor 13 compresses the air flow A directed into it before delivering that air to the core compressor 14 where further compression takes place.

The compressed air exhausted from the core compressor 14 is directed into the combustion equipment 15 where it is mixed with fuel and the mixture combusted. The resultant hot combustion products then expand through, and thereby drive the core, and low-pressure turbines 16, 18 before being exhausted through the nozzle 19 to provide additional propulsive thrust. The core turbine drives the core compressor 14 via a high-pressure shaft 24, and the low-pressure turbine 18 drives the booster compressor 13 via a low-pressure shaft 25. The low-pressure turbine 18 also drives the fan 12 via a gearbox 26 which operatively connects the fan to the low-pressure shaft 25. The fan 12 has a defined speed characteristic that dictates the speed of the low-pressure turbine 18 and booster compressor 13.

Figure 3:
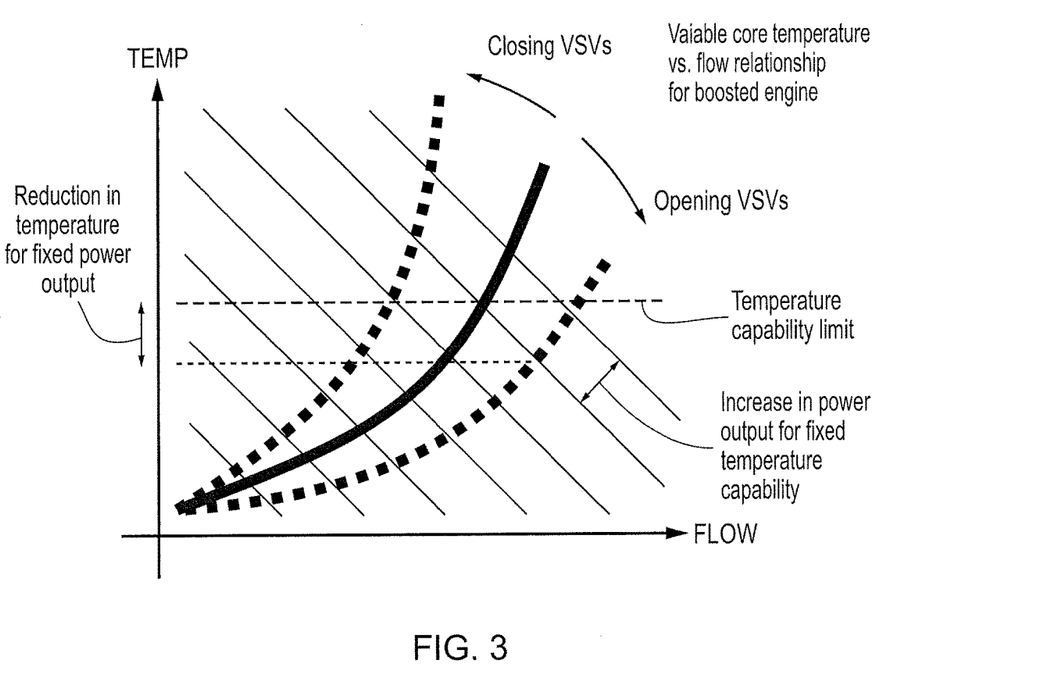
FIG. 3 shows the graph of FIG. 1 overlaid with shifted relationship lines produced by closed and opened positions of VSVs of a geared engine.

The booster compressor 13 has one or more rows of VSVs (optionally including inlet guide vanes), which can be set at different angles, using an actuator mechanism 27 of known type, to change the angle of incidence of the airflow onto the blades of the rotors, and thereby change the amount of work done by the compressor. The scheduling of the variation in the angle of the VSVs can conveniently be controlled by an EEC 28. Advantageously, while changing the VSV angle controls the amount of work done by the booster compressor 13, its speed is set by the characteristics of the fan 12. More particularly, if the VSVs are opened more work is done by the booster compressor 13 and its pressure ratio increases, driving more flow into the engine core. However, if the core turbine temperature is kept constant at the same time as opening the VSVs by regulating fuel flow, the power output from the engine increases. In this way, controlling the VSVs provides a mechanism for shifting the line of the engine's core flow vs. temperature relationship, and thereby enabling a reduction in core temperature for a fixed power output or an increase in power output for a fixed core temperature. This is illustrated in FIG. 3, which shows the schematic graph of FIG. 1 overlaid with shifted relationship lines (indicated as thick dotted lines) produced by closed and opened positions of the VSVs.

A study has shown that, relative to a fixed geometry booster compressor (i.e. one with non-variable stator vanes), a 5% reduction in engine core size is achievable by this approach, which gives rise to a 0.6% improvement in cruise specific fuel consumption and an even more significant reduction in mission fuel burn due to the reduced weight of the smaller core.

Figure 4:
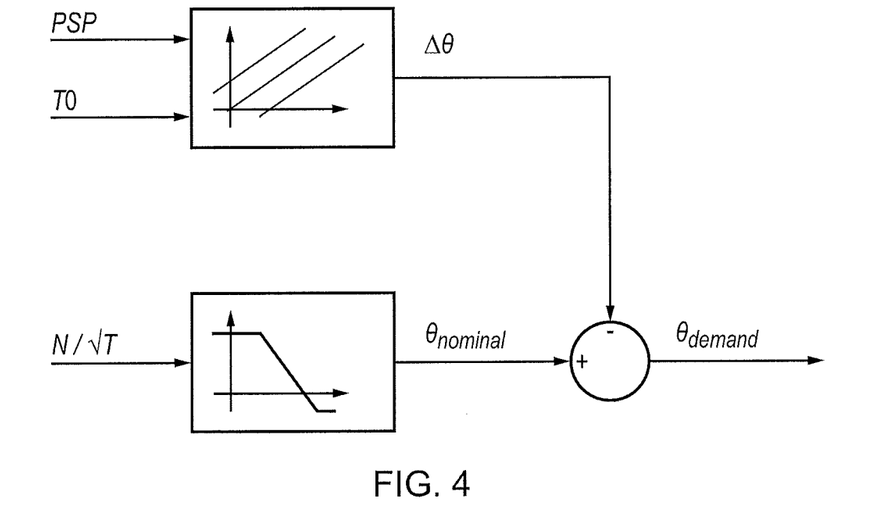
FIG. 4 shows schematically a first control method for scheduling the VSVs of the geared engine.

A first control method for scheduling the VSVs is shown schematically in FIG. 4. As with conventional engines, the VSVs are scheduled against a non-dimensional operating parameter of the engine, typically the corrected speed of the booster compressor $N/\sqrt{T}$, where N is the booster compressor speed and T is the temperature of the inlet air to the fan 12 or the temperature of the inlet air to the booster compressor 13. The output of the schedule is a nominal VSV angle $\theta_{nominal}$. However, a bias $\Delta\theta$, predefined within the control system, is then applied to the output as a function of power setting parameter PSP and inlet temperature to the intake of the gas turbine T0, these two operational parameters being determinative of the temperature at entry to the core turbine 16. The nominal schedule minus the bias sets the VSV demand $\theta_{demand}$ to which the VSV position is then controlled by the actuator mechanism 27. Although the inlet temperature to the intake of the gas turbine T0 is a convenient temperature measurement, temperature measurements taken at other positions upstream of the combustion equipment 15, such as at entry to the booster compressor 13, can be used instead, as they are also determinative, with PSP, of the temperature in the core turbine 16.

As the inlet temperature and/or power demanded from the engine increases, the applied bias $\Delta\theta$ increases, thereby opening the VSVs and increasing core flow and maintaining constant core turbine entry temperatures due to the mechanism previously described. The bias can be defined in such a way that the core turbine entry temperature is maintained constant across a wide range of inlet temperatures (e.g. 180 K to 350 K) and power demand levels (e.g. varying by a factor of 10 or more, or preferably by a factor of 100 or more).

Figure 5:
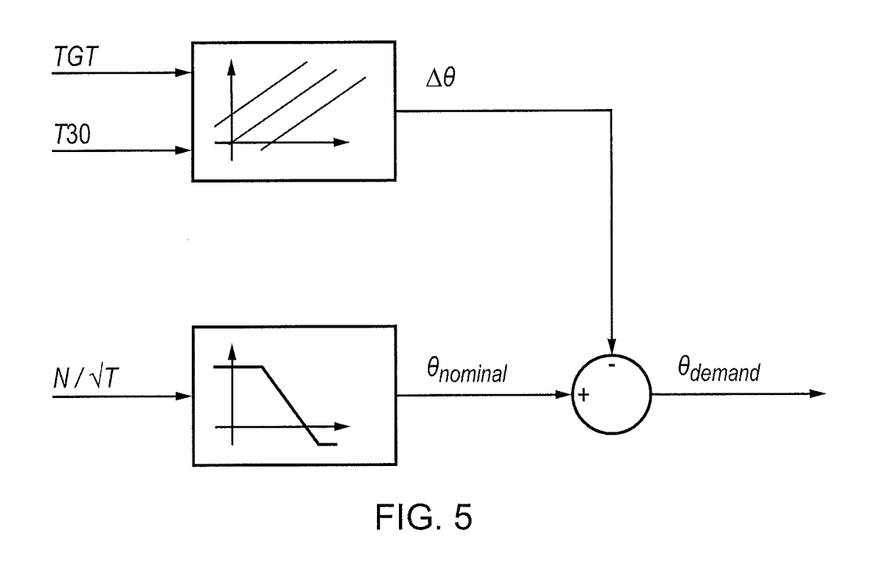
FIG. 5 shows schematically a second control method for scheduling the VSVs.

A second control method for scheduling the VSVs is shown schematically in FIG. 5. In this method, the bias $\Delta\theta$ is applied as a function of a low-pressure turbine entry temperature TGT and core compressor delivery temperature T30.

The rate of consumption of hot section life is dependent on both TGT and T30, and both are directly impacted by movement of the VSVs, but in the opposite sense; at a fixed power output opening the VSVs increases T30 and drops TGT, and vice versa. By using both parameters the bias $\Delta\theta$ can be defined in such a way as to reduce or minimise the consumption of turbine life at all operating conditions. Using (inferred or indirectly measured) core turbine entry temperatures to schedule the bias also has an advantage that the control system accommodates the effects of deterioration i.e. it is not necessary to over-design the engine hardware to cope with increases in operating temperatures during the life of the engine because the control system can maintain constant operating temperatures by progressively applying a larger and larger bias.

Figure 6:
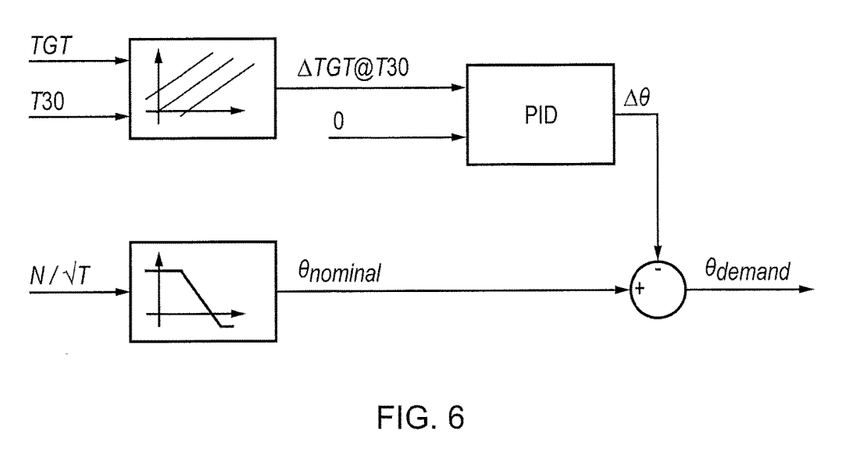
FIG. 6 shows schematically a third control method for scheduling the VSVs.
Figure 7:
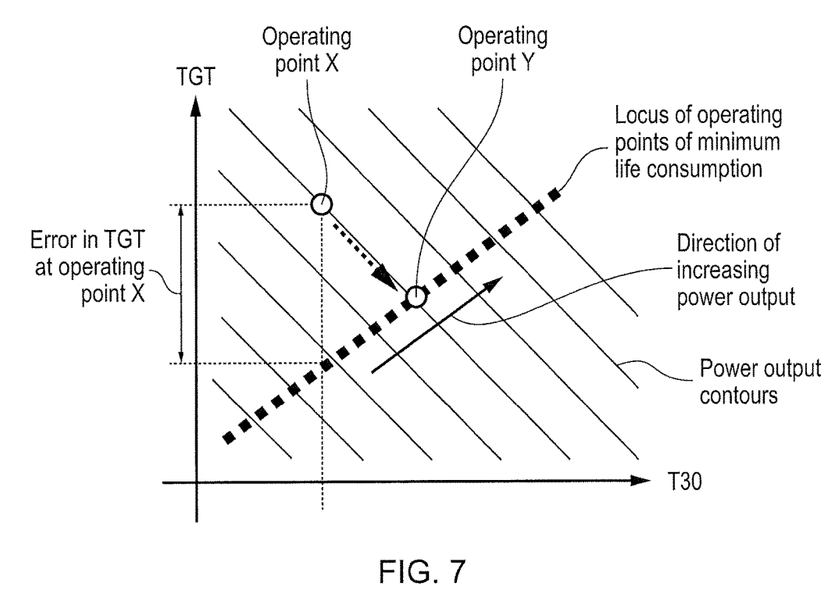
FIG. 7 shows a graph of temperature TGT at entry to the low pressure turbine against compressor delivery temperature T30, and illustrates re-matching of the engine from operating point X to point Y.

A third control method for scheduling the VSVs is shown schematically in FIG. 6. This method is an extension of the second method, the bias $\Delta\theta$ now being controlled fully closed loop by a PID controller as a function of the error in TGT ($\Delta$TGT) at a T30, relative to a desired TGT which would result in minimum life consumption. The principle behind this method of control is illustrated in FIG. 7. For example, when the TGT at a T30 is above that for minimum life consumption, the control system opens the VSVs, thereby re-matching the engine from operating point X to point Y while maintaining the power output of the engine.

Figure 8:
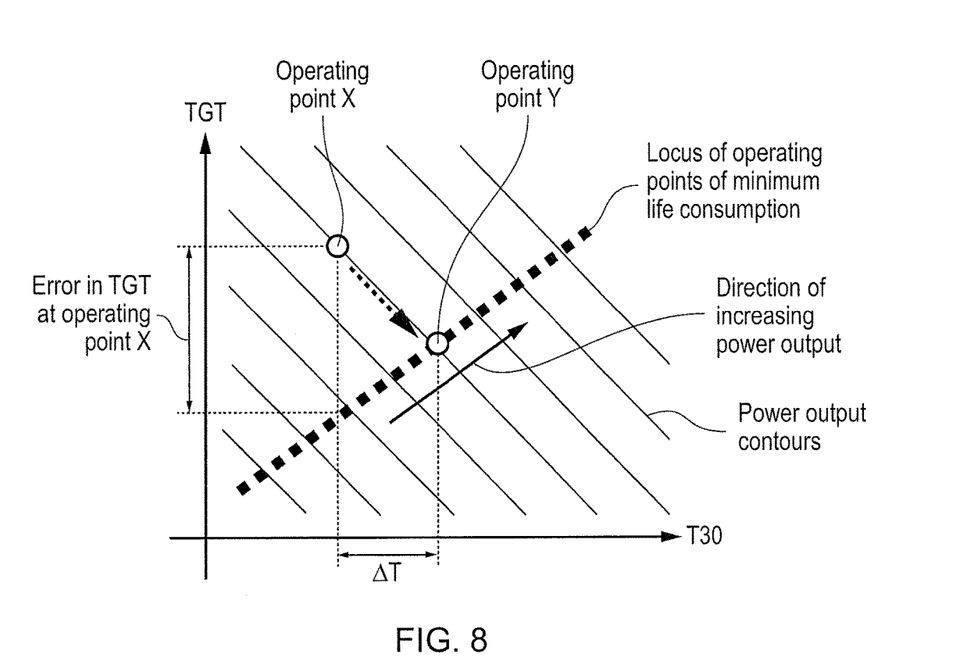
FIG. 8 shows a graph of temperature TGT at entry to the low pressure turbine against compressor delivery temperature T30, and illustrates a reduction in cooling air temperature ΔT produce by a CCA system on re-matching of the engine from operating point X to point Y.

As noted above, moving the VSVs impacts both T30 and TGT. By using the VSVs to reduce TGT at a power setting, T30 is increased. This effect can offset the reduction in turbine life consumption achievable using the VSVs. It may therefore be advantageous to integrate the above methods of VSV control with a cooled cooling air (CCA) system (not shown in FIG. 2). Such a system uses a heat exchanger to cool the cooling air before it is used within the hot section, such that its cooling effectiveness is increased. The CCA system can therefore be used to maintain constant cooling air temperatures while the VSV control system is being used to control the core compressor entry temperature. This is illustrated in FIG. 8, where $\Delta T$ is a reduction in cooling air temperature (relative to T30) produced by a CCA system to counteract the increase in T30 caused by re-matching the engine from operating point X to point Y.

Figure 9:
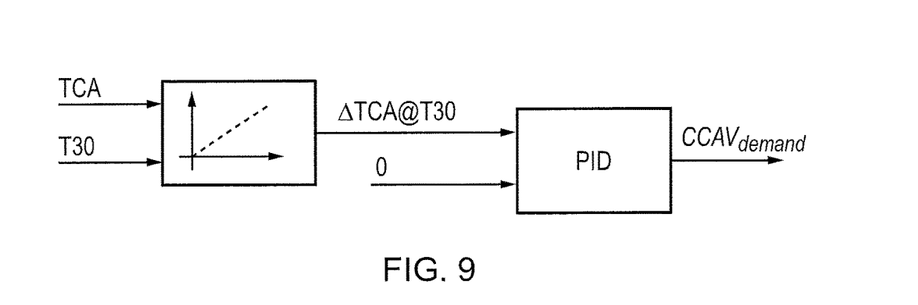
FIG. 9 shows schematically a control method for controlling a heat exchanger valve of a CCA system of the geared engine.

The cooling air temperature TCA may be controlled by regulating the flow on the cold side of the heat exchanger using a valve (CCAV). A method of controlling TCA as a function of T30 is illustrated in FIG. 9. The valve demand $CCAV_{demand}$ is controlled fully closed loop by a PID controller as a function of the error in TCA ($\Delta$TCA) at a T30, relative to a desired TCA.

Figure 10:
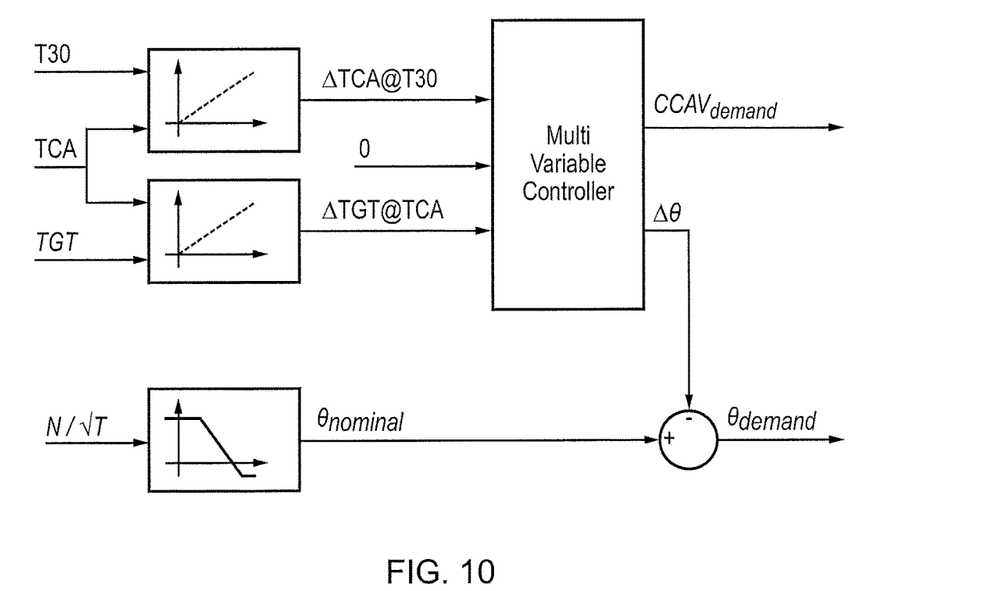
FIG. 10 shows schematically a control method which integrates the VSV control method of FIG. 6 and the control method for controlling the heat exchanger valve of the CCA system of FIG. 9.

The interactions between the CCA control system and VSV control system can be integrated in a multivariable control method, as illustrated in FIG. 10.

The authority of the VSV bias $\Delta\theta$ applied by the above methods of control can be limited to reflect some or all of the following constraints Mechanical constraints: The VSV actuator mechanism 27 may only allow control of the VSV over a fixed angular range. For this reason it may be necessary to impose limits on the demanded VSV position.

Stability constraints: Moving the VSVs impacts the stability margin of the booster compressor 13 and potentially the downstream core compressor 14. For this reason is may be necessary to impose limits to the demanded VSV position to ensure that stable operation of both compressors is maintained. This can be in the form of a limit on booster pressure ratio as a function of speed and VSV position and/or a limit on the core compressor non-dimensional speed as a function of VSV position.

Temperature constraints: Because opening the VSVs reduces TGT but increases T30, the temperature capability of the compressor may become a limiting parameter if the VSVs are opened too far. However, this is less likely to be a limiting constraint when combined with the use of a CCA system.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the invention.

The invention claimed is:

1. A method of controlling a gas turbine engine having in axial flow series, a booster compressor, a core compressor, combustion equipment, a core turbine, and a low-pressure turbine, the core turbine driving the core compressor via an interconnecting high-pressure shaft, the low-pressure turbine driving the booster compressor via an interconnecting low pressure shaft, and the low-pressure turbine also driving an external load having a defined speed characteristic that dictates the speed of the low-pressure turbine and the booster compressor, the booster compressor having one or more rows of variable stator vanes, wherein the method includes:

scheduling variation in the angle of the variable stator vanes as a function of the speed of the booster compressor such that the vanes open as the booster compressor speed increases;

measuring one or more operational parameters that are determinative of the temperature at an entry to the core turbine; and biasing the scheduling of the angle variation of the variable stator vanes as a function of the one or more operational parameters to reduce variation in temperature at the entry to the core turbine.

2. The method according to claim 1, wherein the variation in the angle of the variable stator vanes is scheduled as a function of N/√T, where N is the booster compressor speed and T is the temperature of the inlet air to the fan or the temperature of the inlet air to the booster compressor.

3. The method according to claim 1, wherein the one or more operational parameters include a power demand parameter setting the power output of the engine, and an air temperature measured at a position upstream of the combustion equipment.

4. The method according to claim 1, wherein the one or more operational parameters include a measure of the temperature at an entry to the low-pressure turbine.

5. The method according to claim 4, wherein the one or more operational parameters further include a measure of the temperature of the air exiting the core compressor.

6. The method according to claim 5, further including calculating an error between the measured temperature at the entry to the core turbine and a desired temperature at the entry to the core turbine, the scheduling of the angle variation of the variable stator vanes being biased as a function of the calculated error.

7. The method according to claim 1, wherein the engine further has a cooled cooling air system that cools a flow of cooling air extracted from the core compressor and that is used to cool the combustion equipment and/or the core turbine, the method further including varying the amount of cooling performed by the cooled cooling air system to compensate for variation in the temperature of the flow of cooling air extracted from the core compressor.

8. The method according to claim 1, wherein the gas turbine engine is a turbofan, and the external load is a propulsive fan.

9. The method according to claim 8, wherein the turbofan is a geared turbofan, the propulsive fan being operatively connected to the low-pressure shaft via a gearbox.

10. The method according to claim 1, wherein the gas turbine engine is a static power generating engine, the external load being an electricity generator.

11. A control system for controlling a gas turbine engine having in axial flow series a booster compressor, a core compressor, combustion equipment, a core turbine, and a low-pressure turbine, the core turbine driving the core compressor via an interconnecting high-pressure shaft, the low-pressure turbine driving the booster compressor via an interconnecting low pressure shaft, and the low-pressure turbine also driving an external load having a defined speed characteristic that dictates the speed of the low-pressure turbine and booster compressor, the booster compressor having one or more rows of variable stator vanes, wherein the control system is configured to perform the method of claim 1.

12. A gas turbine engine having in axial flow series, a booster compressor, a core compressor, combustion equipment, a core turbine, and a low-pressure turbine, the core turbine driving the core compressor via an interconnecting high-pressure shaft, the low-pressure turbine driving the booster compressor via an interconnecting low pressure shaft, and the low-pressure turbine also driving an external load having a defined speed characteristic that dictates the speed of the low-pressure turbine and booster compressor, wherein the engine further has the control system of claim 11.

13. A computer program comprising code which, when run on a computer, causes the computer to perform the method of claim 1.

14. A computer readable medium storing a computer program comprising code which, when run on a computer, causes the computer to perform the method of claim 1.

* * * * *